United States Patent [19]
Chanzit et al.

[11] 3,713,147
[45] Jan. 23, 1973

[54] OBSTACLE DETECTION WITH CROSSED FAN BEAM

[75] Inventors: Lawrence Chanzit, Stamford, Conn. 06905; Herbert Green, Elmsford, N.Y. 10523; Huw C. Morgan, Bedford, England

[73] Assignee: United Aircraft Corp., East Hartford, Conn.

[22] Filed: Dec. 23, 1970

[21] Appl. No.: 100,853

[52] U.S. Cl. ................................343/7 A, 343/7 TA
[51] Int. Cl. ..............................................G01s 9/02
[58] Field of Search ..343/7 ED, 7 TA, 11 R, 112 CA

[56] References Cited

UNITED STATES PATENTS

| 3,528,070 | 9/1970 | Young, Jr. | 343/11 R |
| 3,611,376 | 10/1971 | Gutleber | 343/11 R |
| 3,296,579 | 1/1967 | Farr et al. | 343/11 R X |
| 3,412,402 | 11/1968 | Beckwith | 343/112 CA |
| 3,594,794 | 7/1971 | Halpern | 343/1 |

*Primary Examiner*—Malcolm F. Hubler
*Attorney*—Melvin Pearson Williams

[57] ABSTRACT

An obstacle-detecting radar system in which a special receiving antenna fixed in azimuth and positionable in elevation provides a fan-shaped receiving pattern having a wide azimuthal extent and a very narrow elevational extent for receiving reflected radiation originating in a beam transmitted by a terrain radar transmitter which is fixed in elevation and scanned in azimuth and which transmits a fan-shaped radiation pattern having a narrow azimuthal extent and a wide elevation extent to provide the effect of a pencil beam radar which sweeps across the flight path in azimuth in front of the aircraft to provide a signal which actuates an alarm or the like in response to radiation reflected by an obstacle in the flight path.

8 Claims, 5 Drawing Figures

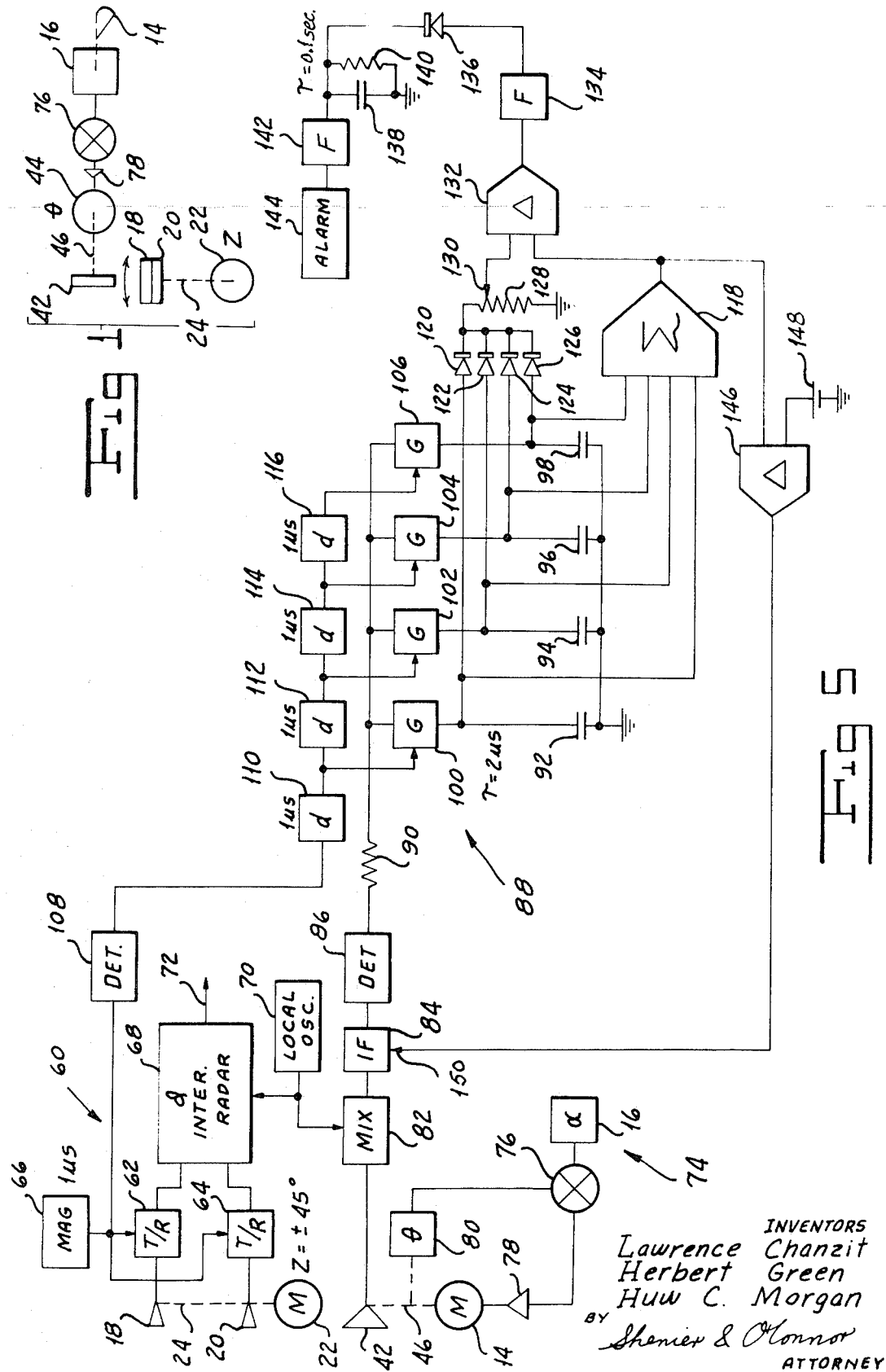

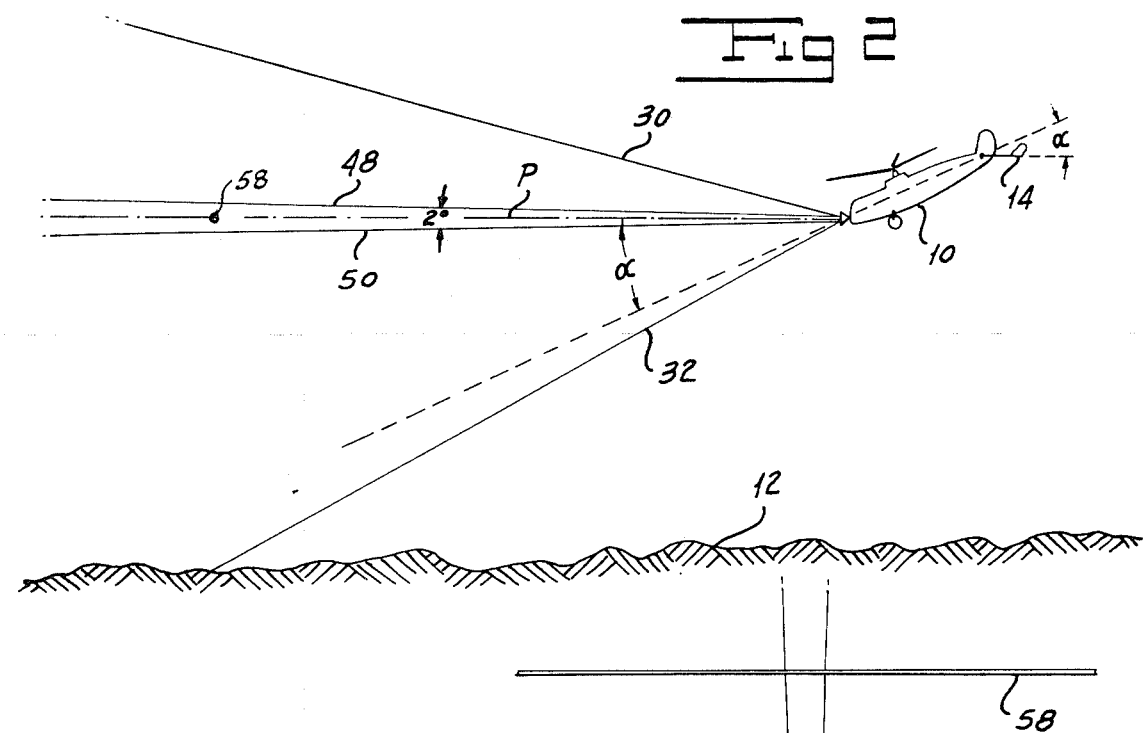
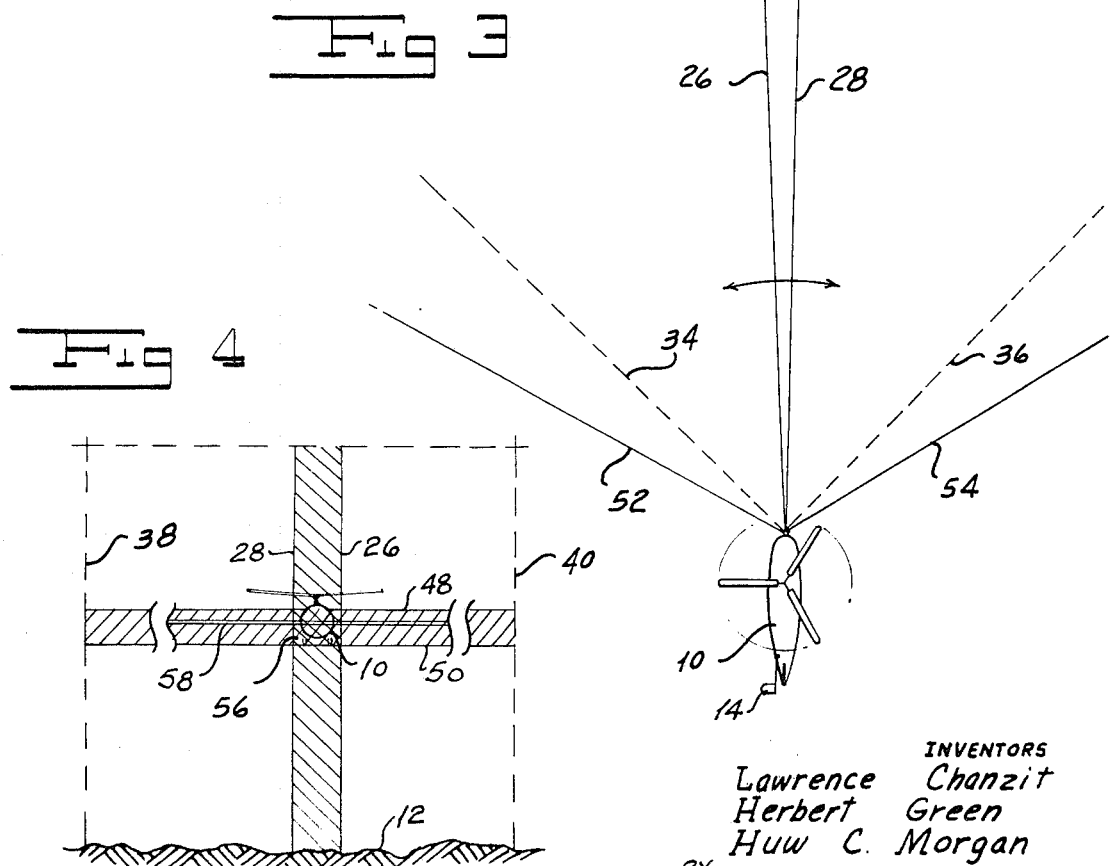
INVENTORS
Lawrence Chanzit
Herbert Green
Huw C. Morgan
BY: Shenier & O'Connor
ATTORNEYS

OBSTACLE DETECTION WITH CROSSED FAN BEAM

BACKGROUND OF THE INVENTION

It is desirable that an aircraft such as a helicopter be able to operate under all weather conditions. Further, in military use of such an aircraft it is desirable that it fly sufficiently low to avoid detection by enemy radar. Moreover, low flying is inherently involved on take-off and in landing. Such low flying involves hazards presented by obstacles such as horizontally disposed cables and their supporting poles which, in the case of power lines, for example, are above the level of terrain and vegetation. Obstacles of that type are difficult to perceive in good weather and are extremely difficult to detect by other than visible means in poor weather. The only sensing system having sufficiently good weather penetration for adequate detection range capability is radar.

Perhaps the most difficult object to detect is a horizontally disposed cable owing to the fact that the radar cross section of the cable is appreciably smaller than the cross sections of vertical poles or towers which support the cable. One of the most commonly used radars in the prior art is a terrain avoidance or terrain following radar in which radiation is transmitted in a pattern having a very narrow azimuthal extent and a relatively wide elevational extent so as to provide a profile of terrain along a given azimuth line. Such a radar system will not satisfactorily detect a horizontally disposed cable since its large elevation coverage does not permit isolation of the cable return from terrain return at the same range. That is, the terrain signal is orders of magnitude greater than the cable return so that the cable is undetected.

One possible solution to the problem outlined above is to provide the aircraft with a pencil beam radar system independent of the other radar systems on the ship for the purpose of detecting cables and poles. Such a solution, however, is not a practical one. It obviously increases the amount of equipment which must be carried by the aircraft and it entails many problems of installation.

We have invented an obstacle-detecting radar system which alerts the pilot to the presence of obstacles in the flight path of the aircraft. Our system utilizes portions of the already existing radar equipment on the aircraft. It does not involve a completely separate and independent radar system. It is relatively simple to install.

SUMMARY OF THE INVENTION

One object of our invention is to provide an obstacle-detecting radar system which facilitates low flying under all conditions of visibility.

Another object of our invention is to provide an obstacle-detecting radar system which detects both vertical poles and thin horizontally disposed obstacles such as cables.

Yet another object of our invention is to provide an obstacle-detecting radar system which makes use of portions of the already existing radar systems on the aircraft.

A further object of our invention is to provide an obstacle-detecting radar system which is relatively simple to install.

Other and further objects of our invention will appear from the following description.

In general our invention contemplates the provision of an obstacle-detecting radar system in which a special receiving antenna, which is fixed in azimuth but which is positionable in elevation, provides a receiving pattern having a wide azimuthal extent and a narrow elevational extent so as to receive reflected radiation which has been transmitted from an existing phase interferometer antenna which is fixed in elevation and scanned in azimuth and which provides a radiation pattern having a narrow azimuthal extent and having wide elevation coverage. The system provides the effect of a pencil beam radar which produces a signal for operating an alarm or the like to alert the pilot to the presence of an obstacle in the flight path.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a diagrammatic view of the antenna system of our obstacle-detecting radar system.

FIG. 2 is a side elevation of an aircraft provided with our obstacle-detecting radar system flying along a generally horizontal flight path.

FIG. 3 is a top plan view of the aircraft illustrated in FIG. 2.

FIG. 4 is a front elevation of the aircraft illustrated in FIGS. 2 and 3 and showing the relationships of the radiating and receiving patterns of our obstacle-detecting radar system.

FIG. 5 is a schematic view illustrating the details of our obstacle-detecting radar system.

DESCRIPTION OF THE PREFERRED EMBODIMENT

Referring to FIGS. 1 to 4 of the drawings we have shown an aircraft such as a helicopter 10 in flight along a flight path P over terrain 12 at an angle of attack $\alpha$. For reasons which will be explained in detail hereinafter we provide the aircraft 10 with a vane 14 for actuating a transducer 16 to provide a signal proportional to the angle $\alpha$.

The aircraft 10 is provided with a conventional phase interferometer radar system comprising upper and lower horns 18 and 20 which, as is known in the art, are fixed in elevation but which are oscillated in azimuth as by a motor 22 which drives a linkage 24 connected to the antenna assembly. Further as is known in the art, the horns 18 and 20 provide a radiation pattern which is narrow in azimuth as indicated by lines 26 and 28 in FIG. 3 but which is relatively wide in elevation as indicated by the lines 30 and 32 in FIG. 2. For example, the pattern may be only about 2° wide in azimuth but may cover an elevation angle of from 40° to 70° in elevation. The motor 22 and linkage 24 may scan the beam provided by the phase interferometer system ±45° for example with reference to the fore and aft axis of the ship 10 between limits indicated by broken lines 34 and 36 for FIG. 3 and by lines 38 and 40 in FIG. 4.

In our obstacle-detecting radar system I mount a special receiving antenna 42 on the craft so as to provide a receiving pattern which is relatively wide in azimuth but which is narrow in elevation. The antenna 42 is fixed in azimuth bit is positionable in elevation by a motor 44 driving a linkage 46 coupled to the antenna 42. The antenna 24 is vertically stabilized in tilt at an elevation angle such that the beam resulting from the intersection of the pattern transmitted by antennae 18 and 20 and of the receiver pattern of antenna 24 scans through the projected flight path as the transmitted beam scans the ground track. For level flight we may, for example, use the output of transducer 16 to the motor 44 to position antenna 42 so that the pattern provided thereby is generally horizontally disposed when the craft is flying along a level path P. By way of example, the horizontal fan beam provided by antenna 42 may be only about 2° wide in elevation as indicated by lines 48 and 50 in FIG. 2 but it may be 120° wide in azimuth as indicated by lines 52 and 54 in FIG. 3. The beam is sufficiently wide in azimuth as to extend beyond the limits 34 and 36 of the azimuthal scale of the vertical fan beam.

In FIG. 4 we have indicated the vertical fan beam produced by horns 18 and 20 by hatching extending downwardly to the right and we have indicated the horizontal fan pattern of the receiving antenna 42 by hatching extending downwardly to the left. As has been pointed out hereinabove the vertical fan beam scans left and right in azimuth between the limits 38 and 40. In all positions of its scan it intersects the horizontal fan pattern over an area one of which is shown in FIG. 4 at 56 so as to give the effect of a pencil beam radar. Moreover, the antenna 42 is so oriented that the pencil beam sweeps across the flight path P of the aircraft 10. In this manner radiation transmitted by the phase interferometer radar which strikes an obstacle such as a thin horizontally disposed cable 58 in the flight path and which is reflected thereby will be picked up by the antenna 42.

As has been explained hereinabove, our overall system includes a phase interferometer radar system indicated generally by the reference character 60 and including the horns 18 and 20 which are fixed in elevation but which are oscillated through ±45° with reference to the fore and aft axis of the aircraft 10 by the motor 22 acting through the linkage 24. Respective transmit/receive devices 62 and 64 which are actuated by a magnetron 66 which puts out pulses having a length of approximately one microsecond pass the energy to be transmitted to the horns 18 and 20. The devices 62 and 64 also pass energy received by horns 18 and 20 to a phase interferometer radar processing system 68 supplied with local frequency from a local oscillator 70. The output of the system 68 appearing on a channel 72 may be applied to a suitable display device (not shown).

The obstacle-detecting system indicated generally by the reference character 74 of our overall radar system includes the horizontal fan beam antenna 42 which, as is pointed out hereinabove, is fixed in azimuth and is positioned in elevation by a motor 14. Further as is pointed out hereinabove, the initial positioning signal is provided by a transducer 16 driven by the vane 14. This initial positioning signal is applied to a difference device 76 which supplies an amplifier 78 to supply the electrical signal to motor 14. The linkage 46 not only drives the antenna 42 but also a feedback transducer 80 which provides a second input signal for the device 76. It will be appreciated that the system just described causes the antenna 42 to be positioned in elevation so as to orient its beam in a substantially horizontal plane.

We apply energy received by the antenna 42 to a mixer 82 supplied with local frequency from the oscillator 70. The output from mixer 82 passes through an intermediate frequency amplifier 84 and through a detector 86 to a range-gated integrator indicated generally by the reference character 88. Integrator 88 includes a common resistor 90 and a plurality of respective storage capacitors 92, 94, 96 and 98 adapted to be connected in series with resistor 90 by respective normally non-conductive gating circuits 100, 102, 104 and 106.

We so gate the output of detector 86 to the various capacitors 92, 94, 96 and 98 that each capacitor corresponds to ranges between certain limits of range. In order to achieve this result we feed the output of magnetron 66 through a detector 108 to a plurality of respective delay circuits 110, 112, 114 and 116, the outputs of which are coupled to the control input terminals of the respective gates 100, 102, 104 and 106. In the particular example illustrated in the drawings each of the delay networks may provide a delay of 1 microsecond. Moreover, we select such values for the resistor 90 and the various storage capacitors as to provide a time constant of around two microseconds for each of the storage units.

Under the conditions just described, when the magnetron 66 emits a pulse the pulse is first detected by detector 108 and then is passed through delay network 110. One microsecond thereafter, network 110 applies the pulse to the control input terminal of gate 100 so that the output of detector 86 is applied to the network including resistor 90 and capacitor 92 for a period of one microsecond which is equal to the length of the transmitted pulse. Two microseconds after transmission of the pulse network 112 applies a pulse to the control terminal of gating circuit 102 to cause energy receiving during the period from 2 microseconds to 3 microseconds after transmission to be applied to the circuit including resistor 90 and capacitor 94. It can be seen that in a similar manner the output of detector 86 is applied to capacitor 96 during the period of from 3 to 4 microseconds after transmission of a pulse while the output of the detector 86 is applied to capacitor 98 over the period from four to 5 microseconds after transmission of a pulse. These, the respective capacitors 92, 94, 96 and 98, correspond respectively to ranges of 500 to 1,000 feet, 1,000 to 1,500 feet, 1,500 to 2,000 feet and 2,000 feet. The range limit of 2,500 feet is selected to prevent ground return at and beyond 3,000 feet from providing a continuous false alarm, assuming the flight path is horizontal at a minimum altitude of 50 feet with a beam width of 2° for receiving horn 42. It will further be appreciated that while we have shown only four storage capacitors, the range out to nearly 3,000 feet may be divided into smaller intervals for better discrimination against side lobe ground return of horn 42.

We apply the stored signal on all of the capacitors 92, 94, 96 and 98 to an averaging circuit 118 which puts out a signal indicating the average of all of the values over the different ranges to which the storage capacitors correspond. Respective diodes 120, 122, 124 and 126 couple the storage capacitors 92, 94, 96 and 98 to a potentiometer 128 including a brush 130. We apply the output of the averaging circuit 118 and the signal on potentiometer 128 to a difference determining network 132 which produces an output signal whenever the signal on the potentiometer 128 exceeds the average by a predetermined amount to indicate that an obstacle has been detected by the crossed fan beams. Brush 130 is so set as to require the obstacle-indicating signal to exceed the average by an amount which is sufficient to prevent false alarms.

We apply the obstacle-indicating signal from network 132 to a suitable triggering device 134. A diode 136 applies to the flip flop output to a holding circuit including a capacitor 138 and a resistor 140 to drive the flip flop 142 which supplies an alarm device 144 of any suitable type known to the art.

We also supply an output of the averaging circuit 118 to one input terminal of a second difference-determining device 146, the other terminal of which is connected to a suitable source of potential such as a battery 148. Whenever the average appearing at the output of device 118 exceeds the reference potential of battery 148, a signal is applied to the gain control terminal 150 of amplifier 84 to reduce the gain. In this way, we control gain so as to compensate for variations in reflectivity of terrain.

In operation of our radar system the antennas 18 and 20 are fixed in elevation and are oscillated in azimuth so as to provide a radiation pattern which is very narrow in azimuth but which is relatively wide in elevation. In response to radiation reflected from the terrain the system 68 puts out a signal on channel 72 which is applied to a suitable display device in a manner similar to that in which information is presented in phase interferometer radars of the prior art.

Our special receiving antenna 42 is fixed in azimuth and is positioned in elevation so as to provide a radiation pattern which includes the flight path. By way of example the antenna 42 may be positioned in elevation by a signal resulting from the position of vane 14. The pattern produced by antenna 42 is narrow in elevation and is relatively wide in azimuth. The result of the two crossed beams respectively from antennas 18 and 20 and from antenna 42 is a pencil beam which sweeps across the flight path.

The system including the mixer 82, amplifier 84 and detector 86 applies received radiation in the pencil beam to the range-gated integrator 88 which includes resistor 90 and storage capacitors 92, 94, 96 and 98. The network 118 carries the average value of the stored information on the storage capacitors. The individual capacitor signals are applied to potentiometer 128 by devices 120, 122, 124 and 126. If, for example, an obstacle is present at a range of about 1200 feet, the signal from diode 22 exceeds the average by an amount sufficient to cause the difference circuit 132 to actuate the trigger circuit 134 to apply a pulse to flip flop 142 to actuate alarm 144. Thus, the pilot is alerted to the fact that an obstacle is in the flight path so that he must gain altitude if the obstacle is to be avoided.

It will be appreciated that our system not only adequately discriminates between terrain return and return from a cable or the like owing to the crossed beam arrangements but also it effectively, reliably detects vertical radar cross section to permit them to be distinguished from terrain return. It is to be noted also that while a horizontally disposed obstacle such as a cable gives a detectable return only if the transmitted beam intersects it at right angles any other cable has such a great length in the scan field that some of its vertical supports will be detected. The difference-determining device 146 provides a means for varying gain in the obstacle-detecting channel to compensate for variations in terrain reflectivity.

It will be seen that we have accomplished the objects of our invention. We have provided an obstacle-detecting radar for detecting relatively low obstacles. Our system not only detects vertical obstacles but also thin horizontally disposed obstacles such as cables or the like. It makes use of already existing radar equipment on the ship. It does not require any separate and independent system for low obstacle detection. It is simple to install.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not be limited to the specific details shown and described.

Having thus described our invention, what we claim is:

1. A radar system for an aircraft having a flight path with reference to an azimuthal plane and an elevational plane including in combination means including a first antenna for transmitting energy in a pattern having a narrow azimuthal extent and a wide elevational extent, including a second antenna for receiving reflected energy in a pattern having a narrow elevational extent and a wide azimuthal extent, means mounting the first and second antennas on the aircraft such that their patterns intersect, means for oscillating the first antenna in azimuth, means for aligning the elevational orientation of the second antenna with the flight path, means responsive to reflected energy received by said second antenna for producing a first signal, a plurality of storage devices, means for sequentially coupling said first signal to said storage devices at times corresponding to respective range values, means for producing a second signal in accordance with an average of the contents of said storage devices, means for comparing the contents of the individual storage devices with the second signal, and means responsive to said comparing means for indicating the presence of an obstacle.

2. A radar system as in claim 1 in which said mounting means mounts said first antenna at a fixed orientation in said elevational plane and mounts the second antenna at a fixed orientation in the azimuthal plane.

3. A radar system for an aircraft having a flight path with reference to an azimuthal plane and to an elevational plane including in combination, a first antenna providing a pattern having a wide extent in said elevational plane and having a narrow extent in said azimuthal plane, a second antenna providing a pattern having a narrow extent in said elevational plane and having a wide extent in said azimuthal plane, means mounting said first and second antennas on said aircraft such that their patterns intersect, means for oscillating one of said antennas in its plane of narrow extent, means for aligning the elevational orientation of the second antenna with the flight path, means for feeding energy to be transmitted to one antenna, and means responsive to reflected energy received by the other antenna for indicating the presence of an obstacle.

4. A radar system for an aircraft having a flight path with reference to an azimuthal plane and to an elevational plane including in combination, a first antenna providing a pattern having a wide extent in said elevational plane and having a narrow extent in said azimuthal plane, a second antenna providing a pattern having a narrow extent in said elevational plane and having a wide extent in said azimuthal plane, means mounting said first and second antennas on said aircraft such that their patterns intersect, means for oscillating said first antenna in said azimuthal plane, means for aligning the elevational orientation of the second antenna with the flight path, means for feeding energy to be transmitted to one antenna, and means responsive to reflected energy received by the other antenna for indicating the presence of an obstacle.

5. A radar system for an aircraft having a flight path with reference to an azimuthal plane and to an elevational plane including in combination, a first antenna providing a pattern having a wide extent in said elevational plane and having a narrow extent in said azimuthal plane, a second antenna providing a pattern having a narrow extent in said elevational plane and having a wide extent in said azimuthal plane, means mounting said first and second antennas on said aircraft such that their patterns intersect, means for oscillating one of said antennas in its plane of narrow extent, means for feeding energy to be transmitted to one antenna, and means responsive to reflected energy received by the other antenna for indicating the presence of an obstacle, said indicating means comprising means responsive to reflected energy received by said other antenna for producing a first signal, a plurality of storage devices, means for sequentially coupling the first signal to said storage devices at times corresponding to respective range values, and means for providing a second signal in accordance with an average of the contents of said storage devices.

6. A radar system as in claim 5 in which the means producing the first signal comprises a variable gain amplifier, said system including means responsive to the second signal for controlling the gain of said amplifier to compensate for variations in terrain reflectivity.

7. A radar system as in claim 5 in which the indicating means further includes means for comparing the content of at least one storage device with the second signal.

8. A radar system as in claim 5 in which the indicating means further includes means providing a third signal in accordance with the maximum content of any storage device and means for comparing the second signal with a fractional portion of the third signal.

* * * * *